United States Patent [19]

Szabó et al.

[11] Patent Number: 4,902,884

[45] Date of Patent: Feb. 20, 1990

[54] CIRCUIT ARRANGEMENT FOR CARRYING OUT LIGHT INTENSITY MEASUREMENTS

[75] Inventors: Gábor Szabó; Márta S. Burgert, both of Györ, Hungary

[73] Assignee: Dunacoop Kereskedelmi és Idegenforgalmi Vállalkozásokat Szervezó Szolgáltató Lebonyolít, acu/o/ GT, Budapest, Hungary

[21] Appl. No.: 178,014

[22] Filed: Apr. 5, 1988

[30] Foreign Application Priority Data

Apr. 10, 1987 [HU] Hungary ..................... 1596

[51] Int. Cl.$^4$ ............................................ H01J 40/14
[52] U.S. Cl. ..................................... 250/210; 250/205
[58] Field of Search ........... 250/208, 209, 210, 214 R, 250/214 A, 214 C, 205; 356/222, 226

[56] References Cited

U.S. PATENT DOCUMENTS

| | | | |
|---|---|---|---|
| 3,315,153 | 4/1967 | Whatley | 250/210 |
| 3,751,154 | 8/1973 | Frazee et al. | 250/210 |
| 4,016,423 | 4/1977 | Meyer | 250/210 |
| 4,281,325 | 7/1981 | Jarva | 250/205 |
| 4,598,586 | 7/1986 | Danielson | 250/205 |
| 4,674,900 | 6/1987 | Erzsebet et al. | 250/231 R |

FOREIGN PATENT DOCUMENTS

| | | |
|---|---|---|
| 877070 | 9/1961 | United Kingdom . |
| 1063140 | 3/1967 | United Kingdom . |
| 1249052 | 10/1971 | United Kingdom . |
| 1282366 | 7/1972 | United Kingdom . |

OTHER PUBLICATIONS

"Differential Light Detector", RCA Catalog of 1986, 1-86, p. 368.

Primary Examiner—David C. Nelms
Attorney, Agent, or Firm—Spencer & Frank

[57] ABSTRACT

In a circuit arrangement for carrying out light intensity measurements, comprising an input terminal (5), an output terminal (6), a first and a second photodiodes ($D_1$, $D_2$) for receiving light emitted by an optical light source (S) and a first and a second operational amplifiers (1, 2) for receiving output current signals of the first and second photodiodes ($D_1$, $D_2$) generated under influence of the emitted light, the novelty lies in further comprising a four branch bridge circuit including in two adjacent branches the first and second photodiodes ($D_1$, $D_2$) coupled to a common point by their respective poles of the same sign and oppositely to them in the further two adjacent branches two bridge resistors ($R_1$, $R_2$), a third operational amplifier (3) for supplying power to the optical light source (S), current generator means connected by its input to the input terminal (5) and by its one output to the common point and an input of the third operational amplifier (3) for driving the bridge circuit, wherein the first operational amplifier (1) is inserted between the first photodiode ($D_1$) and the junction point of the bridge resistors ($R_1$, $R_2$), and the second operational amplifier (2) is connected by its input to the second photodiode ($D_2$) and by its output led to the output terminal (6) is reversely connected to the input by means of a compensation resistor ($R_k$).

14 Claims, 1 Drawing Sheet

CIRCUIT ARRANGEMENT FOR CARRYING OUT LIGHT INTENSITY MEASUREMENTS

THE BACKGROUND OF THE INVENTION

The invention relates to a circuit arrangement for carrying out light intensity measurements. The proposed circuit arrangement comprises an input terminal, an output terminal, at least two operational amplifiers, a first and a second photodiode generating output current signals for respective operational amplifiers under influence of an optical light source. The circuit arrangement according to the invention is capable of carrying out differential measurements and offers the possibility of selecting pairs of photodiodes, wherein the emissivity of a light emitting diode depending on the temperature and the variation of the parameters of a photodiode depending on the temperature and time can be compensated.

The known circuit arrangements for carrying out light intensity measurements applied e.g. for determining small displacements suffer from being sophisticated, comprising a great number of active and passive elements. A simple circuit arrangement constituting a differential light detector is shown in the catalogue of the RCA Corporation (U.S.) in the 1986 edition, issue 1-86, page 368 (drawings nr. 92CM-30009). In this circuit arrangement, however, the drift of the characteristic parameters of the receiving photodiodes, as of their short-circuit current or no-load voltage as the circuit arrangements stands in the catalogue, cannot be compensated. The problem is that some important parameters of the photodiodes show high spread being sometimes as high as 10% in dependency on the temperature and light intensity, further in course of their natural aging. Therefore it has been always necessary to select the photodiodes to forming pairs with regard to the slope of their characteristics and temperature drift values.

The known differential light detectors are usually applied in sensor arrangements for measuring displacements, different processes resulting in the change of the intensity of the light reaching the photodiodes. The basis of the measurements is the feature that the sum of the short-circuit current of the light receiving photodiodes is regulated to be stable for ensuring alteration of the short-circuit current of any one of the photodiodes, the alteration being proportional to a light intensity change to be measured.

SUMMARY OF THE INVENTION

The object of the invention is to provide a circuit arrangement for carrying out light intensity measurements, comprising a relatively low number of active and passive elements and being capable of compensating for the effect of the alteration of the parameters of the photodiodes, the alteration following from the change of the temperature and the aging process of the active elements.

The invention is based on the perception that the photodiodes should be arranged in a bridge circuit.

Therefore the invention is a circuit arrangement for carrying out light intensity measurements comprising an input terminal, an output terminal, a first and a second photodiode for receiving light emitted by an optical light source and a first and a second photodiodes for generating current signals under influence of the emitted light. The proposed circuit arrangement comprises further a four branch bridge circuit including in two adjacent branches the first and second photodiodes coupled to a common point by their respective poles of the same sign and including oppositely to the latter in the further two adjacent branches two bridge resistors; a third operational amplifier for suppling—advantageously through a power amplifier—power to the optical light source being preferably a light emitting diode; current generator means connected by its input to the input terminal of the arrangement and by its output to the common point of the first and second photodiodes and to an input of the third operational amplifier for driving the bridge circuit and the optical light source, wherein the first operational amplifier is coupled through its input to the first photodiode and through its output to the junction point of the bridge resistors and the second operational amplifier is connected through its input to the second photodiode and through its output to the output terminal, further the output of the second operational amplifier is connected to its input through a feed-back member.

Preferably, the feed-back member is constituted either by a single compensation resistor, or by a series connection including a compensation resistor, the first operational amplifier and one of the bridge resistors. In the first case the resistance value of the bridge resistors are selected to have a ratio to be equal to the ratio of the ground-state (equal illumination state) short-circuit currents of the first and second photodiodes. In the second case, however, it is important that the resistance values of the bridge resistors be equal.

The main advantage of the proposed circuit arrangement is that it is capable of compensating for the aging and temperature changes of the parameters of both the receiving and emitting photodiodes, ensuring the possibility of dead-zero and living zero measurements.

BRIEF DESCRIPTION OF THE DRAWINGS

The invention will be described in more detail by way of example and with reference to some preferred embodiments illustrated in the accompanying drawings. In the drawings

DESCRIPTION OF THE PREFERRED EMBODIMENTS

Figure 1:
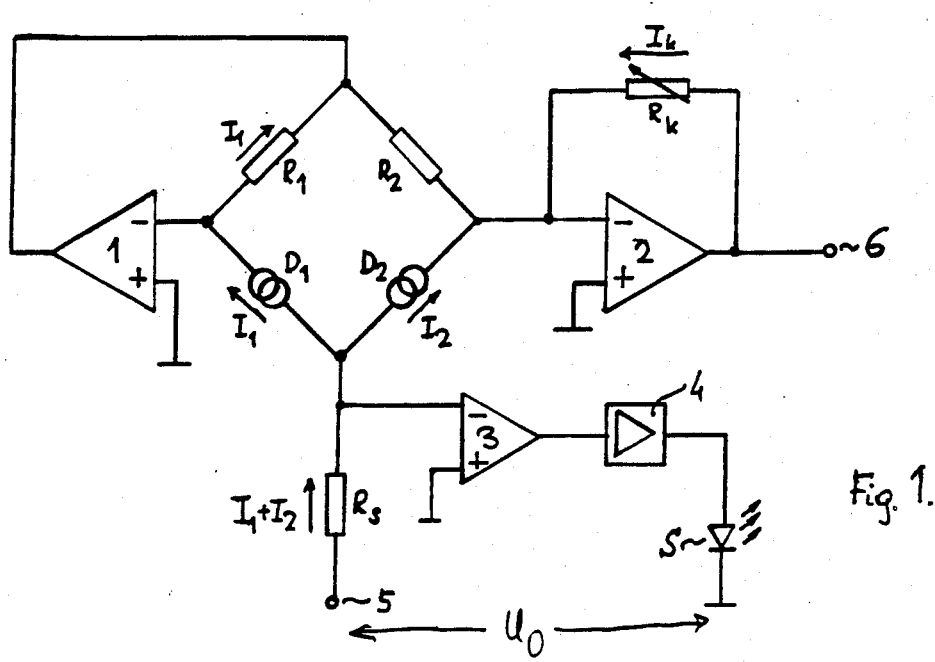
FIG. 1 is the circuit diagram of a generic embodiment of the circuit arrangement proposed by the invention and FIG. 2 shows the circuit diagram of a specific embodiment of the circuit arrangement proposed by the present invention.

The circuit arrangement as proposed by the invention (FIG. 1) includes an input terminal 5 connected to a supply unit ensuring voltage $U_0$, connected over current generating means, especially a reference resistor $R_s$ to a common terminal of a bridge circuit coupled with a first operational amplifier 1 and a second operational amplifier 2 and of a third operational amplifier 3. The third operational amplifier 3 is connected to an optical light source S, especially a light emitting diode, if necessary, through a power amplifier 4.

The second operational amplifier 2 is coupled with a common terminal connected to an output terminal 6 of the proposed arrangement and through a feed-back member with the input of the second operational amplifier 2. The feed-back member is constituted in the embodiment of FIG. 1 by a compensation resistor $R_k$ and the embodiment of FIG. 2 by a compensation resistor $R_k$, the first operational amplifier 1 and a bridge resistor $R_2$.

The essence of the invention lies in applying the bridge circuit having four branches. The common terminal of this bridge circuit connecting the poles of the same sign of a first photodiode $D_1$ and a second photodiode $D_2$ is connected over the common terminal to the reference resistor $R_s$. Oppositely to the two adjacent branches including the first and second photodiodes $D_1$, $D_2$ there are two adjacent branches including the first bridge resistor $R_1$ being an element of the feed-back member according to FIG. 2 and a second bridge resistor $R_2$. The common terminal of the first photodiode $D_1$ and the first bridge resistor $R_1$ is coupled with an input of the first operational amplifier 1 and the junction point of the first and second bridge resistors $R_1$, $R_2$ is connected with the output of the first operational amplifier 1. The common terminal of the second photodiode $D_2$ and the second bridge resistor $R_2$ is coupled with an input of the second operational amplifier 2.

Figure 2:
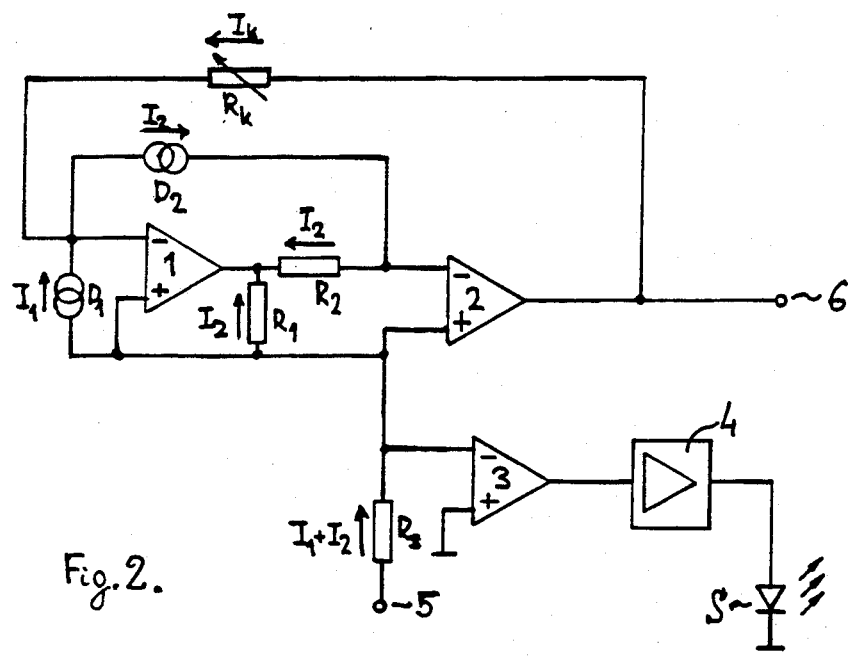

The common terminal of the third operational amplifier 3 and the reference resistor $R_s$ is coupled with the common point of the bridge circuit connecting the first and second photodiodes $D_1$, $D_2$ directly in the embodiment of FIG. 1 and through the first photodiode $D_1$ in the embodiment of FIG. 2.

The way of operating the proposed circuit arrangement can be characterized as follows.

The current generator means ensures in all normal circumstances a current $I_1+I_2$ being the sum of the short-circuit current of the first and second photodiodes $D_1$, $D_2$.

Before the measurements the short-circuit currents $I_1$ and $I_2$ should be measured for a ground state of the equipment which serves to carrying out the light intensity measurements. If $I_1=I_2$ it is possible to apply the relatively simpler embodiment of FIG. 2 wherein $R_1=R_2$. This is a possibility of equalizing the circuit arrangement, however generally $I_1 \neq I_2$. In this latter case it is preferable to select the values $R_1/R_2=I_1/I_2$ for the first and second bridge resistors, ensuring thereby the so-called dead-zero output signal (this means, the zero output signal level corresponds to the ground state of the circuit arrangement. Selecting another value ratio for the bridge resistors the so-called living zero output signal can be generated, wherein an output signal level differing from zero is obtained.

The first and second photodiodes $D_1$, $D_2$ are connected by means either of their anodes ensuring current flow direction according to the Figures, or of their cathodes ensuring the opposite flow direction.

The measurements are based on the fact that the alteration of the intensity of the light falling on the photodiodes $D_1$, $D_2$ results in an output signal on the output terminal 6 differing from the ground signal.

In the embodiment of FIG. 2 the simplicity of the arrangement is compensated by the fact that the output signal comprises the error of selecting the bridge resistors (in ground state there is no signal level, but the error of the measurements is increasing with the increasing output signal level). In the embodiment of Fgiure 1 the output of the second operational amplifier 2 provides an output signal on the output terminal 6 having the value $$\Delta I_K = \Delta L_1 \frac{I_1 + I_2}{I_1}$$

wherein $\Delta I_k$ means the alteration of the current value of the compensation resistor $R_k$, $\Delta I_1$ is the alteration of the short-circuit current $I_1$ of the first photodiode $D_1$ under influence of the light emitted by the light source S and $I_2$ is the short-circuit current of the second photodiode $D_2$.

Because of the stable $I_1+I_2$ value the input of the third operational amplifier is fed with the necessary current of picaampere level and depending on its type it can supply directly or by means of a power amplifier the power necessary for operating the optical light source S being generally a light emitting diode. The light of this light source S is projected on the first and second photodiodes $D_1$, $D_2$ receiving generally different light intensities during the measurements. For example, an element is applied for covering one and opening the other photodiode in course of a displacement to be measured.

In practice the $I_2/I_1$ value changes generally in the range from 1 up to 2 to 5, what gives a high level of the signal measured, oppositely to the known arrangements wherein the difference between the current levels is desired to be suppressed and is deemed to be an important error factor.

The application of the third operational amplifier ensures that a light emitting diode being the optical light source S emits always light corresponding to the changing parameters of the light receiving photodiodes $D_1$, $D_2$.

In a practical realisation of the invention the operational amplifiers were realised by integrated circuits CA 3130 (product of the RCA Company), requiring very low input current levels.

If necessary, the resistors applied in the proposed circuit arrangement can be potentiometers. This is especially preferable when the circuit arrangement is applied for selecting pairs of photodiodes.

What we claim is:

1. A circuit arrangement for carrying out light intensity measurements, comprising
   an input terminal,
   an output terminal,
   an optical light source,
   a first and a second photodiode,
   a first and a second operational amplifier for receiving current signals generated by said first and second photodiodes under influence of said emitted light,
   a third operational amplifier for supplying power to said optical light source,
   a four branch bridge circuit including in two adjacent branches said first and second photodiodes coupled to a common point by their respective poles of the same sign and further including oppositely to the latter in the remaining two adjacent branches a first and a second bridge resistor,
   current generator means arranged between said input terminal and said bridge circuit, provided with an output connected to a common terminal of said bridge circuit and said third operational amplifier for driving said bridge circuit and the optical light source, wherein said first operational amplifier is coupled with its input to said first photodiode and with its output to the junction point of said first and second bridge resistors, and said second operational amplifier is connected via its input to said second photodiode and via its output to said output terminal, further said output of said second operational amplifier is connected to its input through a feed-back member.

2. The circuit arrangement as set forth in claim 1, wherein said feed-back member is constituted by a compensation resistor.

3. The circuit arrangement as set forth in claim 1, wherein a power amplifier is arranged between said third operational amplifier and said optical light source.

4. The circuit arrangement as set forth in claim 1, wherein said optical light source is constituted by a light emitting diode.

5. The circuit arrangement as set forth in claim 1, wherein said current generating means are constituted by a reference resistor connected to said input terminal supplying reference voltage.

6. The circuit arrangement as set forth in claim 1, wherein at least one of said bridge resistors comprises a potentiometer.

7. The circuit arrangement as set forth in claim 1, wherein said compensation resistor comprises a potentiometer.

8. A circuit arrangement of the carrying out light intensity measurements, comprising an input terminal,
an output terminal,
an optical light source,
a first and a second photodiode,
a first and a second operational amplifier for receiving current signals generated by said first and second photodiodes under influence of said emitted light,
a third operational amplifier for supplying power to said optical light source,
a four branch bridge circuit including in two adjacent branches said first and second photodiodes coupled to a common point by their respective poles of the same sign and further including oppositely to the latter in the remaining two adjacent branches a first and a second bridge resistor,
current generator means connected by their input to said input terminal and by their output to a common terminal of said bridge circuit and said third operational amplifier for driving said bridge circuit and said optical light source, said common terminal coupled through said first photodiode to said common point of said first and second photodiodes, wherein said first operational amplifier is coupled with its input to said first photodiode and with its output to the junction point of said first and second bridge resistors, and said second operational amplifier is connected through its input to said second photodiode and through its output to said output terminal, further said output of said second operational amplifier is connected to its input through a feed-back member comprising a series connection of a compensation resistor, said first operational amplifier and said second bridge resistor, wherein said two bridge resistors are characterized by substantially equal resistance.

9. The circuit arrangement as set forth in claim 8, wherein a power amplifier is arranged between said third operational amplifier and said optical light source for energizing said optical light source.

10. The circuit arrangement as set forth in claim 8, wherein said optical light source is constituted by a light emitting diode.

11. The circuit arrangement as set forth in claim 8, wherein said current generating means are constituted by a reference resistor connected to said input terminal supplying reference voltage.

12. The circuit arrangement as set forth in claim 8, wherein at least one of said bridge resistors comprises a potentiometer.

13. The circuit arrangement as forth in claim 8, wherein said compensation resistor comprises a potentiometer.

14. The circuit arrangement as set forth in claim 8, wherein said reference resistor comprises a potentiometer.

* * * * *